United States Patent [19]

Smith

[11] 4,242,868
[45] Jan. 6, 1981

[54] HYDRO-POWER GENERATION SYSTEMS

[76] Inventor: Charles E. Smith, 7932 Eisenhower Blvd., Bridgeport, N.Y. 13030

[21] Appl. No.: 933,819

[22] Filed: Aug. 15, 1978

[51] Int. Cl.³ .......................... F03B 9/00; F03G 7/00
[52] U.S. Cl. ............................................ 60/496; 415/5
[58] Field of Search ............................... 60/496; 415/5

[56] References Cited

U.S. PATENT DOCUMENTS

| | | | |
|---|---|---|---|
| 2,135,110 | 11/1938 | Platt | 60/496 |
| 2,513,136 | 6/1950 | Borsos | 60/496 |
| 3,360,926 | 1/1968 | Parr | 60/496 |
| 3,466,866 | 9/1969 | Eschenfeld | 60/496 |
| 4,054,031 | 10/1977 | Johnson | 60/496 |

Primary Examiner—Allen M. Ostrager
Attorney, Agent, or Firm—Charles S. McGuire

[57] ABSTRACT

A plurality of related systems for converting potential energy present by virtue of gravitational and buoyant forces associated with a body of water into kinetic energy and useful power. A pair of parallel, flexible belts are joined by rigid links or rungs affixed at their ends to each belt and passing over one or more rotatable gears having radial teeth with a pitch equal to the spacing of the links. The belts are turned by mechanism attached thereto which is exposed to either the kinetic force of flowing or falling water, or the buoyant force of a body of water upon elements attached directly to the belt and/or links.

4 Claims, 7 Drawing Figures

HYDRO-POWER GENERATION SYSTEMS

BACKGROUND OF THE INVENTION

The present invention relates to power generation and, more specifically, to novel means for converting the potential energy from gravitational and buoyant forces associated with a body of water into useful power.

Much of the electrical energy presently consumed is provided by hydro-electric generators. In some parts of the world virtually all electricity comes from generators powered by water from natural falls or man-made dams. It is also true, however, that a virtually insignificant fraction of the energy present in natural bodies of water, including ocean tidal action, flowing rivers and streams, waterfalls, etc., is effectively utilized. In addition to the useful power which may be obtained by harnessing the energy of naturally moving water, principles of gravity and buoyancy may be employed to produce energy from stationary bodies of water and by collecting and channeling rain water.

It is a principal object of the present invention to provide novel and improved apparatus for producing useful energy from water.

A further object is to provide a hydro-electric generating system powered by tidal action.

Another object is to provide novel means for extracting a portion of the kinetic energy of rain water in areas where it would otherwise be channeled from an elevated position to ground level without producing useful energy.

A still further object is to provide novel apparatus having buoyant elements which move through an enclosed body of water and electrical generating means powered by movement of the elements.

Still another object is to provide power generating means compatible with and movable by any of a plurality of water systems, both moving and stationary.

Other objects will in part be obvious and will in part appear hereinafter.

SUMMARY OF THE INVENTION

In accordance with the foregoing objects, the invention comprises a pair of flexible, continuous belts of equal length which are arranged parallel to one another and connected by a series of rigid, spaced links or rungs. The belts are passed around a plurality of rotatable members, at least one of which has radial teeth in the nature of a gear, the pitch of the teeth being equal to the spacing of the links. Elements which are either buoyant or capable of holding water are attached to the belts and/or connecting links so that the force of buoyancy or gravity provided by water acting upon the attached elements produces rotation of the belts and thus of the gear. This rotational movement is transferred to conventional power generating means such as an electrical generator to provide useful energy.

In a first embodiment, apparatus of the general type described above is associated with a hollow tank having a valve in the lower wall thereof through which the tank may be filled with and emptied of water. The tank is surrounded by and vertically reciprocal within an enclosure in the nature of a vertical shaft which also has an opening with a movable closure element at or near the bottom. The shaft is located in suitable proximity to a natural body of water which will serve to periodically fill the shaft and allow drainage thereof through the lower opening. The tank moves upward by the buoyant force of the water as the shaft is filled. The tank is then also filled while at the top of its travel and moves downward by gravitational force of the water contained therein upon drainage of the shaft. Ratchet teeth, or similar one-way engagement means, are positioned on the front and rear side of the tank and engage the links on the flexible belts to effect uni-directional rotation thereof as the tank rises and falls. The tank is also drained at the lower end of its travel in preparation for the next upward travel by buoyancy upon refilling of the shaft.

In a second embodiment, the flexible belts and associated elements are positioned upon a building having means on the roof for collecting rain or melted snow and channeling it to a location adjacent the upper end of the belts. A series of open containers are affixed to the belts and are filled with water as they pass an outlet of the reservoir at the top of the building. The weight of the water in the containers on one side of the belts effects rotation thereof to turn the electrical generators. The containers empty as they turn over at the lower end of the belt run as it changes direction.

In a third embodiment, the belts travel through a U-shaped enclosure filled with water or brine and open at both ends. A plurality of inflatable and deflatable bellows are attached at spaced intervals to the belts and are constrained between the belts and guide tracks which are arranged around the belts and spaced therefrom by a greater distance on one side of the U-shaped path than on the other. Thus, the bellows are compressed between the belts and tracks, being in a deflated condition, during downward travel through one leg of the enclosure. At the lower end of the belt run a movable air hose connection engages a one-way valve on the bellows and inflates the latter during movement to the wider-spaced portion of the belts and tracks. The belts are rotated by buoyancy of the inflated bellows.

A further embodiment is powered by water flowing at high velocity in a stream or channel. A plurality of collapsible scoops are attached at spaced intervals to the flexible belts and links which are arranged in a horizontally elongated, continuous path. The scoops open by gravity as they pass along the lower run of the path, which is submerged in the flowing water, and substantially close by gravity on the upper run to reduce resistance to movement in the direction opposite to that of the water.

BRIEF DESCRIPTION OF THE DRAWNGS

DETAILED DESCRIPTION

Figure 1:
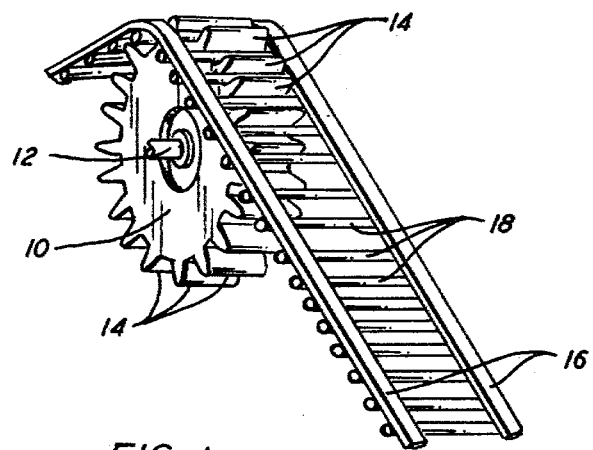
FIG. 1 is a fragmentary, perspective view of a portion of the continuous belts and a gear turned thereby.

Referring now to the drawings, in FIG. 1 is seen a fragment of the primary power transmission means of the invention. Gear 10, having radially extending teeth 14, is affixed to shaft 12 for transmission of rotation from the gear to the shaft. A pair of continuous belts 16 of equal length are connected by rigid links 18 which are affixed at their opposite ends to the belts in parallel relation spaced by a distance equal to the pitch of teeth 14. Belts 16 are of a flexible but strong material, such as stranded steel cable, and are spaced by a distance slightly greater than the thickness or width of gear 10. Thus, by providing motive power to belts 16 by one or more of the fluid drive systems hereinafter described, gear 10 and shaft 12 are rotated by engagement of links 18 between teeth 14, such rotation being transferred through appropriate transmission gears to power generating means such as conventional electrical generators (not shown).

Figure 2A:
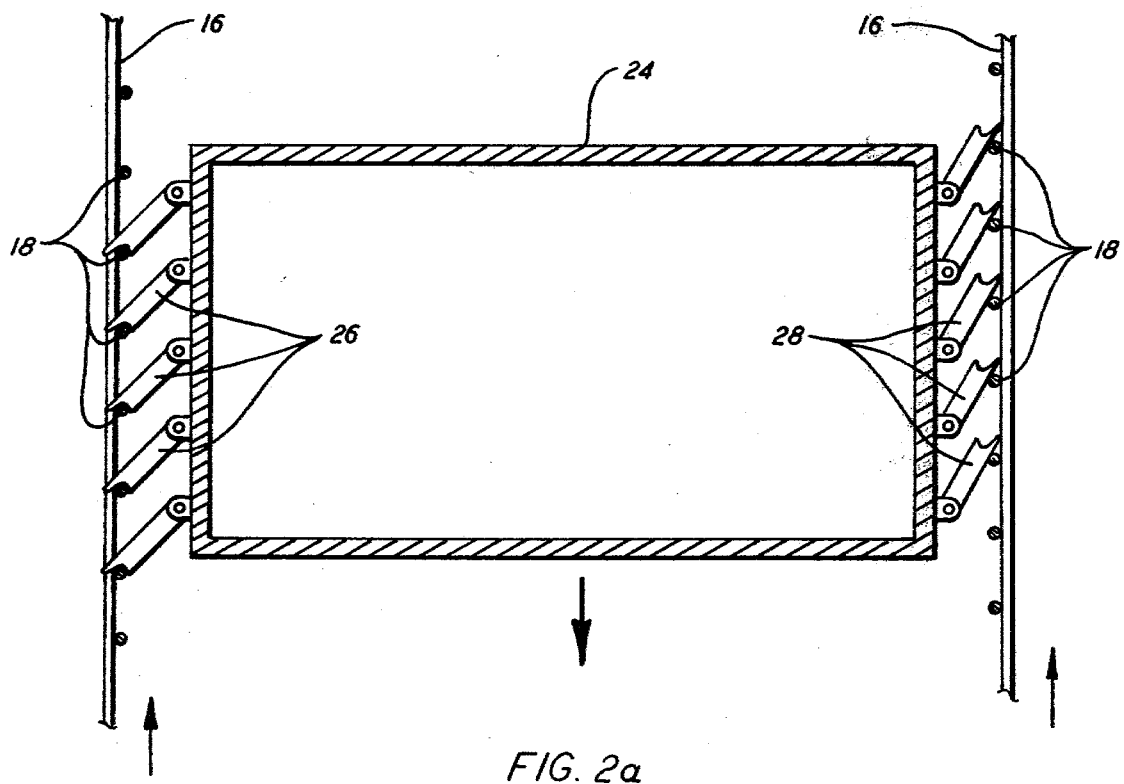
FIG. 2a is a fragmentary, sectional, side elevational view showing certain portion of the apparatus of FIG. 2 in greater detail.
Figure 2:
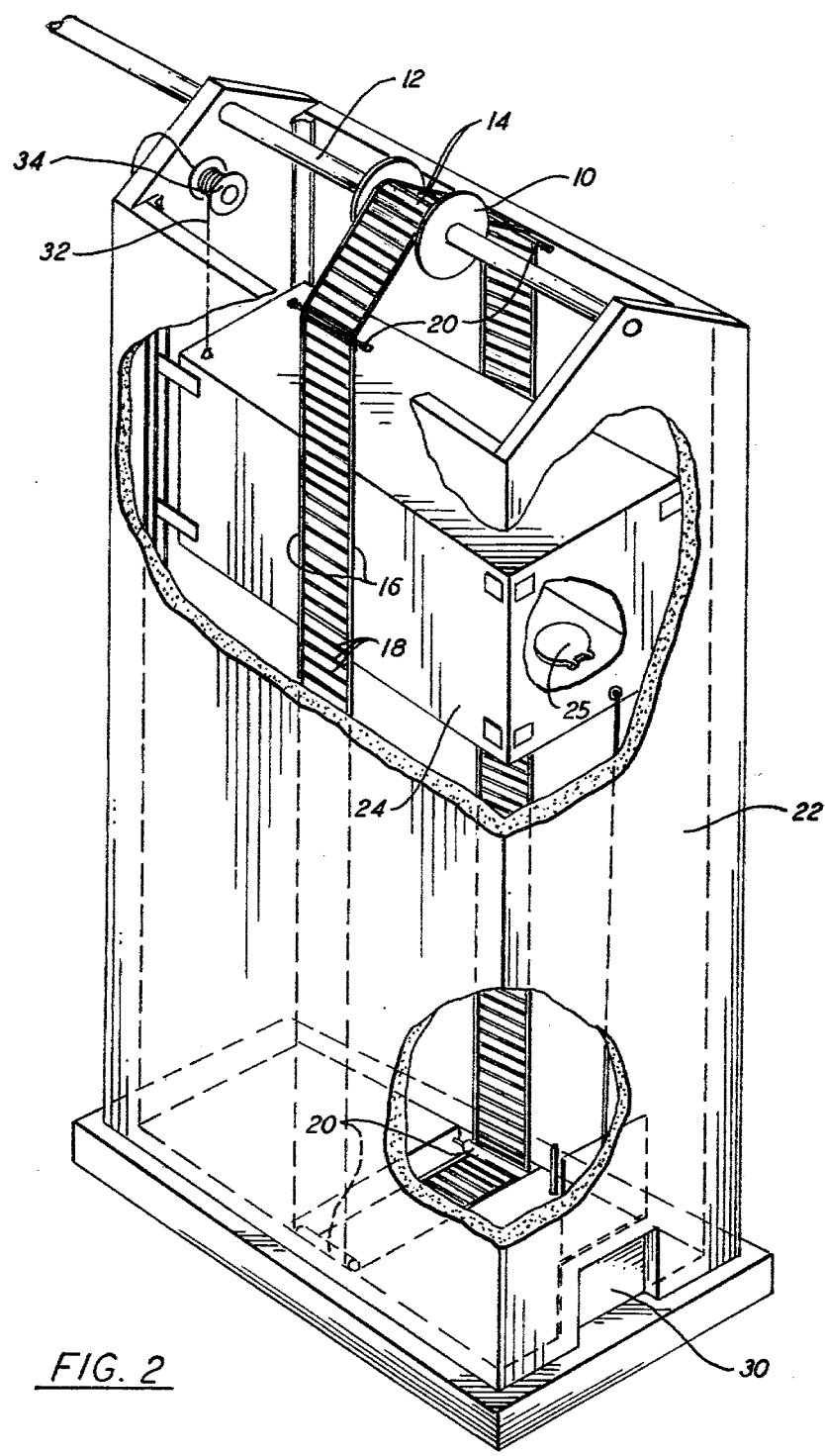
FIG. 2 is a perspective view of a first embodiment of structure for power generation according to the present invention.

Turning now to FIG. 2, a power generation system wherein motive power is provided by alternating forces of buoyancy and gravity is illustrated. Links 18 are affixed to belts 16 and engage teeth 14 for rotation of gear 10 and shaft 12, as previously described. Suitable idler rolls 20 are provided to establish the path of belts 16. Shaft 12 is horizontally disposed across the open top of hollow enclosure 22 within which tank 24 is vertically movable, constrained by suitable guideways. Tank 24 is a fully enclosed, hollow container having an opening in the lower wall with valve member 25 movable between open and closed positions with respect thereto.

Figures 3, 4:
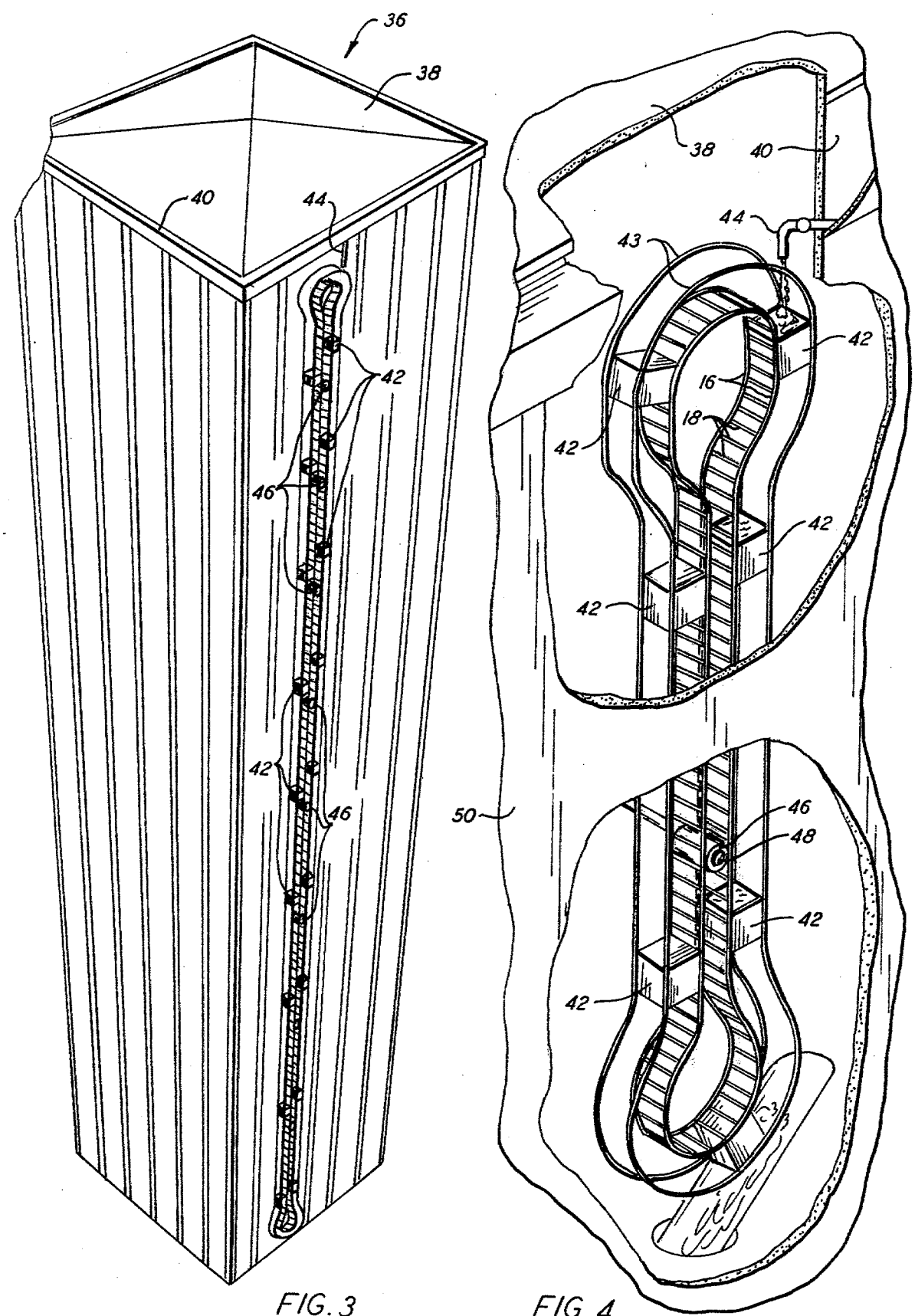
FIG. 3 is a perspective view of another embodiment of power generating means.
FIG. 4 is an enlarged, fragmentary, perspective view of portions of FIG. 3.

On its forward and rear walls, i.e., the walls facing and closely adjacent to the vertical runs of belts 16, tank 24 is provided with one-way engagement members in the nature of hinged teeth for engagement with rungs 18, as best seen in FIG. 3. The engagement members on the front and rear walls of tank 24 are denoted by reference numerals 26 and 28, respectively. Both members 26 and 28 are mounted for limited pivotal movement, and so constructed and arranged relative to links 18 that members 26 engage the adjacent links 18 during downward travel of tank 24, as members 28 ride over the links on the rear run of belts 16 during upward movement thereof, as indicated by the arrows in FIG. 3. During upward travel of tank 24, members 28 engage links 18 on the rear run of belts 16 as members 26 ride over the links on the front run, which are moving in the opposite direction.

Tank 24 is raised by buoyancy and lowered by gravity to impart movement to shaft 12. A gate valve is provided by door 30 which is movable by appropriate control means between open and closed positions with respect to an opening at the lower end of one of the side walls of enclosure 22. With tank 24 initially at the lower end of its travel, at or near the bottom of enclosure 22, door 30 is opened to allow water to enter enclosure 22, preferably by a natural source of water. Shaft 12 is locked against rotation at this time by any convenient means, and valve 25 is closed. Sufficient clearance is provided between tank 24 and the interior walls of enclosure 22 to allow free entry of water into the enclosure.

An enclosure 22 is filled with water, tank 24 remains at the bottom due to the engagement of members 28 with links 18 on the rear run of belts 16 and the inability of the belts to move due to the locking of shaft 12. When enclosure 22 is filled to an extent providing the desired degree of buoyancy for tank 24, shaft 12 is released and the tank begins to rise. Loading on shaft 12, and consequently the power output obtained therefrom, is only slightly less than the buoyant force tending to raise tank 24 within enclosure 22. Thus, the tank moves very slowly, but through proper gear ratios drives one or more generators at a rate producing an electrical power output commensurate with the buoyant force of the tank.

When tank 24 reaches the upper limit of its travel, as determined by the water level in enclosure 22, shaft 12 is again locked against rotation. Valve 25 is opened and tank 24 is allowed to fill with water, at least to the extent that it is submerged therein. If desired, a hollow, flexible tube or hose 32 may be attached at one end to the upper wall of tank 24, to communicate with the interior thereof, and at the other end to a source of air pressure and vacuum (not shown) which may be selectively or automatically switched between one or the other. Hose 32 is wound on a spring loaded reel 34 supported at the upper end of enclosure 22 so that it may wind and unwind as tank 24 travels up and down. Application of vacuum through hose 32 when tank 24 is at the upper end of enclosure 22 will allow the tank to fill with water to a greater extent than it otherwise would.

After tank 24 has filled with water to the extent desired, valve 25 is closed and door 30 is opened to allow the water within enclosure 22 to drain. Since shaft 12 is locked against rotation, tank 24 does not travel downwardly as enclosure 22 drains. After the water level in enclosures 22 has dropped at least below the lowest portion of the tank, shaft 12 is released and tank 24 begins to descend by its own weight and that of the water contained therein. Members 26 engage link 18 on the front run of belts 16, thus rotating shaft 12 resuming the aforementioned power generation. Again, the loading on shaft 12 is only slightly less than the gravitational force on tank 24 and the water contained therein in order to obtain the maximum useful power output.

When tank 24 reaches the lower end of enclosure 22, valve 25 is opened and the water is drained from tank 24. If no water is present outside enclosure 22 at this time, the water drained from tank 24 may be allowed to drain from enclosure 22 through open door 30. Alternatively, door 30 may be closed and tank 24 drained into enclosure 22 by application of air pressure through hose 32. Valve 25 is then closed and enclosure 22 again filled to begin another cycle. Depending upon the cycle time and power output of the system, depending principally upon its size which is contemplated to be very large, it may be practical to place enclosure 22 in a location such that it can be filled and drained by tidal action, thus completing four power output cycles (two by upward and two by downward movement of tank 24) each approximately twenty-four hours. Alternatively, enclosure 22 may be located near a natural body of water within a suitable lock having a water level controlled to provide filling and draining of enclosure 22 in accordance with the cycle time providing the desired power output.

Turning now to FIGS. 3 and 4, a system for generating power from water collected from natural precipitation on tall buildings or other man-made structures. For purposes of illustration, multi-story building structure 36 is pictured with the continuous, flexible belt-like unit common to all embodiments of the invention incorporated therein. Building 36 includes an open roof 38, sloping slightly toward the edges, encircled by trough 40. Belts 16 are again arranged in an endless loop with two closely adjacent, vertical runs extending between substantially the top and bottom of building 36.

Containers 42 are fixedly attached to belts 16 and/or links 18 at evenly spaced positions thereon. Each of containers 42 is open on one side only, the open side being upwardly directed on the downward run of belts 16 and downwardly directed on the upward run. Stationary guide tracks 43 may be provided in evenly spaced relation to belts 16 about the periphery thereof to assist in supporting and guiding containers 42. Drain spout 44 extends from the bottom of trough 40 to a position above the uppermost container 42 on the downward run of belts 16. Thus, as water flows from roof 38 into trough 40 and through spout 44, it is deposited in containers 42 and its weight produces rotation of belts 16.

Links 18 engage the teeth on a plurality of gears 46, arranged between the two runs of belts 16 and preferably engaged by links 18 on both the upward and downward runs. Each of gears 46 is affixed to a corresponding shaft 48 (FIG. 4) which extends inside building 36 to drive electrical generators (not shown) positioned therein on various levels. If necessary, power may be provided through shafts 48 and gears 46 to effect initial rotation of belts 16 until a sufficient number of containers 42 have been filled to provide rotation solely through the weight of the water. Also, the loads on shafts 48 may be gradually increased from zero to full load as more of containers 42 are filled. Although the system may be mounted externally, it is preferably enclosed by an outer wall, such as that of which a fragment of which is shown in FIG. 4 and denoted by reference numeral 50.

Figure 5:
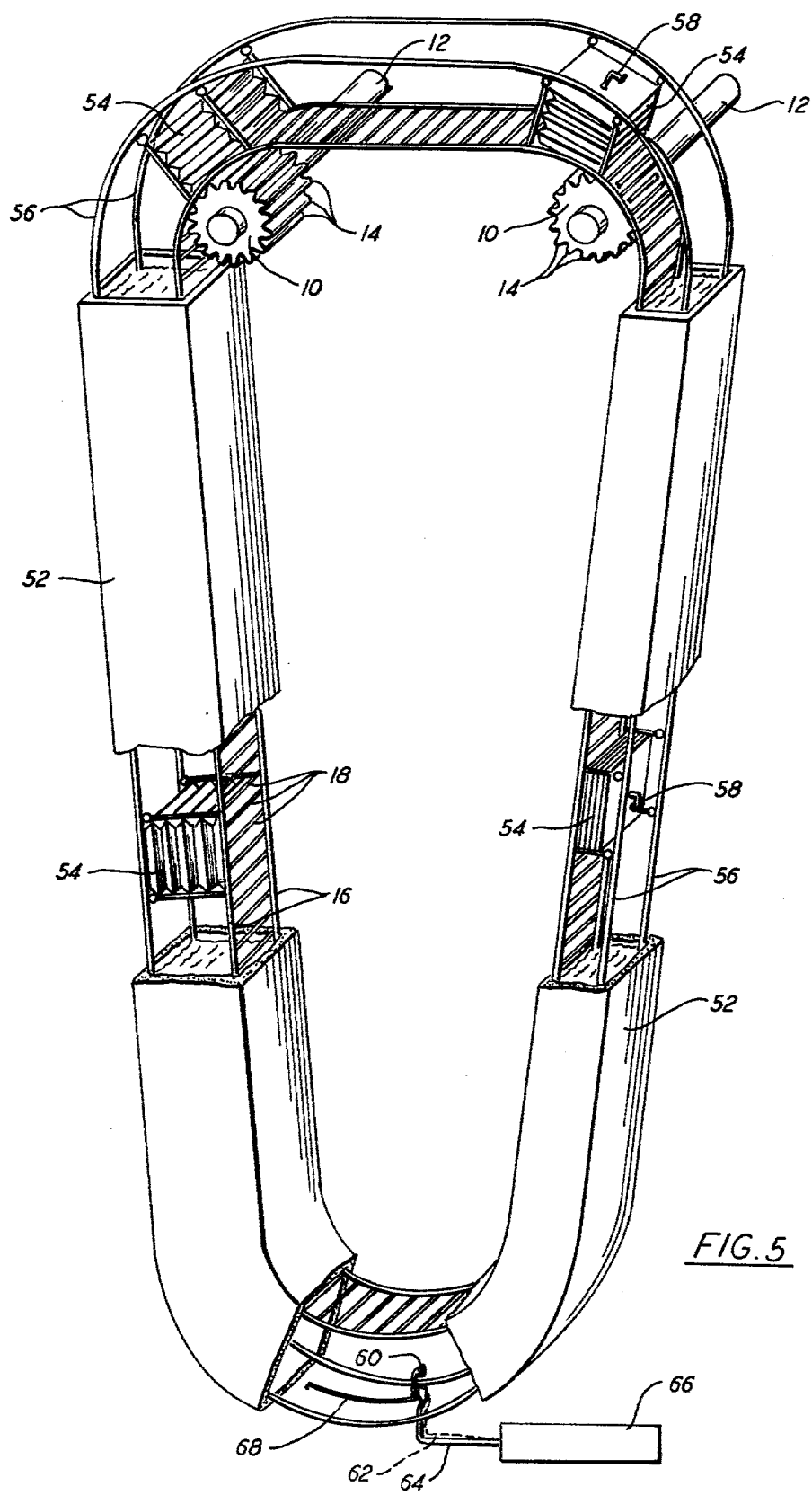
FIGS. 5 and 6 are perspective views, with portions broken away, of third and fourth embodiments of the power generating means of the invention.

The system pictures in FIG. 5 provides rotation of belts 16, and thereby power shafts 12 through engagement of links 18 with teeth 14 on gears 10, solely through the buoyant force of elements affixed thereto. Once again, belts 16 are arranged in a continuous loop, the major portion of their lengths being in two substantially vertical runs. The vertical and lower portions of the path of travel of belts 16 is enclosed within U-shaped passageway 52, one leg of which is of smaller cross section than the other. The upper ends of each leg of passageway 52 are open.

Expansible and contractable bellows members 54 are affixed to belts 16 and/or links 18 at spaced intervals. A pair of guide tracks 56 are fixedly supported in spaced relation to belts 16 around the entire path thereof. Belts 16 and tracks 56 are substantially parallel over the vertical portions of the belt run, the spacing changing gradually in the upper and lower portions to correspond essentially to the cross section of passageway 52.

A swivel mounted air valve 58 extends from the side of each bellows member 54 which is downwardly facing in the lower portion of passageway 52. The free end of each valve 58 engages with the end of a movable element 60, connected to flexible tube 62 which extends through a sealed opening in the lower wall of passageway 52 into the interior of larger, fixed tube 64. A source of pressurized air 66 communicates with tube 64 and thereby with tube 62 and element 60.

Each of bellows members 54 is slidingly engaged at its four corners by means 70 to tracks 56. Thus, bellows construction, i.e., air can pass both in and out upon application of sufficient pressure although the valves will not admit water to enter the bellows members. Pressure provided by source will thus serve to fill bellows members 54 and the pressure exerted by the converging portions of belts 16 and tracks 56 is sufficient to expel the air in the portion of travel where the bellows are outside the water. Power output from shafts 12 will be commensurate with the number and size of bellows members 54, which may be designed as desired.

Figure 6:
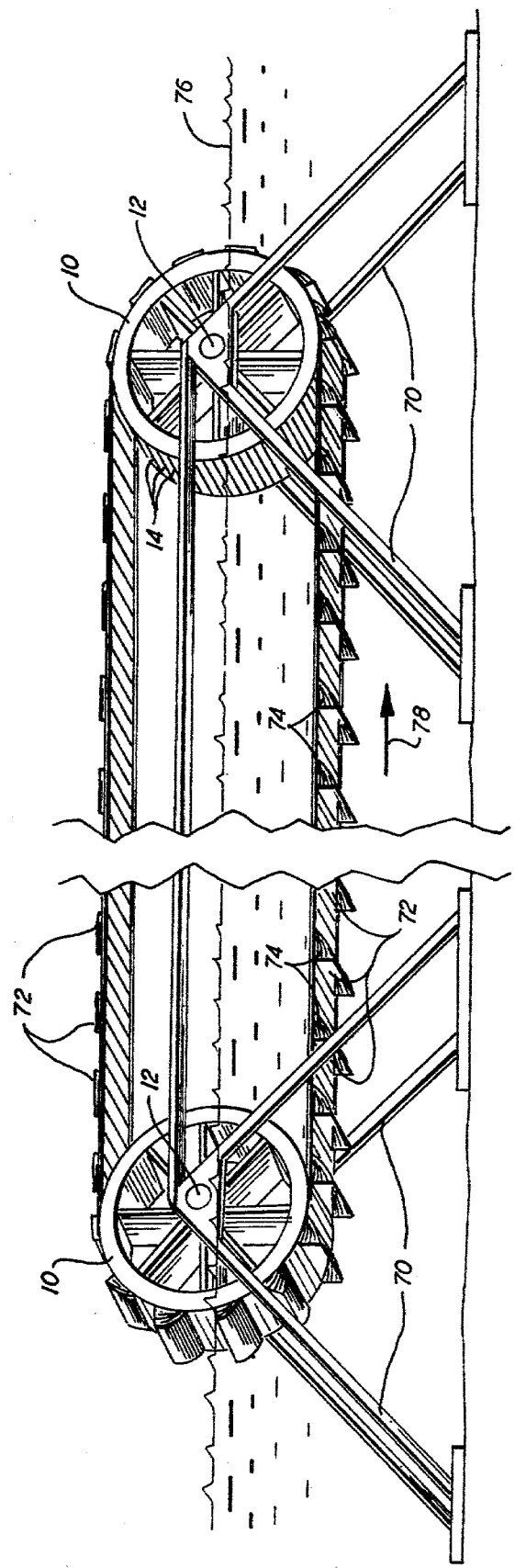

Turning now to FIG. 6, a system for extracting useful power from the kinetic energy of a swiftly flowing stream, river, or other body of water, is shown. In this case the gears, again denoted by reference number 10, are mounted upon platforms 70 which are supported on the bed of the waterway. Belts 16 again pass in an endless path around gears 10 with links 18 engaging gear teeth 14. Flexible scoops 72 are attached to belts 16 and/or links 18 at spaced intervals. The sides 74 of scoops 72 are flexible and so arranged that the scoops open and close by gravity as they travel along the lower and upper runs, respectively, of the belts which in this case are arranged in substantially horizontal runs. At least the complete lower run of belts 16 is submerged below the surface 76 of water flowing in the direction of arrow 78. Thus, scoops 72 form closed pockets having open sides opposing the water flow and thereby acted upon by the current to rotate belts 16, gears 10 and shafts 12, providing useful power output. The scoops are closed on the upper run, thereby reducing resistance to movement and enhancing efficiency.

What is claimed is:

1. A system for generating useful energy from forces associated with a quantity of water, said system comprising:
   (a) a pair of endless flexible belts of equal length;
   (b) a plurality of rigid links each affixed at opposite ends to said belts to maintain the latter in parallel relation, said links being spaced at equal, predetermined intervals about the periphery of said belts;
   (c) at least one gear having teeth extending radially from its periphery, the pitch of said teeth being equal to said predetermined intervals, said links being in meshed engagement with said teeth;
   (d) a power shaft connected to said gear for rotation thereby;
   (e) a plurality of inflatable and deflatable bellows fixedly attached in spaced relation to at least one of said belts and links in driving engagement and movable in a path producing movement of said belts, and thereby rotation of said gear and shaft, in a single direction;
   (f) a U-shaped conduit defining two substantially parallel, vertical legs, open at the top, and a connecting lower portion, at least a substantial portion of said path being enclosed within said conduit;
   (g) means for deflating said bellows when positioned in one of said legs and for inflating said bellows when positioned in the other of said legs; and
   (h) a quantity of water contained by said conduit and exerting a buoyant force upon said bellows when positioned in said other leg to apply thereto a force sufficient to move said bellows, and thereby said belts, in said single direction.

2. The invention according to claim 1 and further including means for compressing said bellows on one of said vertical runs and expanding said bellows on the other of said vertical runs, said bellows going from compressed to expanded in moving through said lower portion of said path.

3. The invention according to claim 2 and further including means for admitting air to the interior of said bellows.

4. The invention according to claim 3 wherein said means for admitting air include valve means associated with said bellows and air inlet means associated with said lower portion of said path.

* * * * *